(12) United States Patent
Aono

(10) Patent No.: US 9,690,422 B2
(45) Date of Patent: Jun. 27, 2017

(54) TOUCH PANEL APPARATUS AND TOUCH PANEL CONTROL METHOD

(71) Applicant: KYOCERA Document Solutions Inc., Osaka (JP)

(72) Inventor: Shinya Aono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/888,421

(22) PCT Filed: Jan. 28, 2015

(86) PCT No.: PCT/JP2015/052249
§ 371 (c)(1),
(2) Date: Oct. 30, 2015

(87) PCT Pub. No.: WO2015/115447
PCT Pub. Date: Aug. 6, 2015

(65) Prior Publication Data
US 2016/0110014 A1     Apr. 21, 2016

(30) Foreign Application Priority Data

Jan. 30, 2014  (JP) ................................. 2014-015764

(51) Int. Cl.
*G06F 3/041*  (2006.01)
*G06F 3/0488*  (2013.01)
(Continued)

(52) U.S. Cl.
CPC ............ *G06F 3/0416* (2013.01); *G06F 3/016* (2013.01); *G06F 3/0414* (2013.01);
(Continued)

(58) Field of Classification Search
CPC .......... G06F 3/016; G06F 2203/013–2203/015
See application file for complete search history.

(56) References Cited

U.S. PATENT DOCUMENTS 9,170,651 B2 * 10/2015 Kono ..................... G06F 3/016
9,317,117 B2 *  4/2016 Kono ..................... G06F 3/016
(Continued)

FOREIGN PATENT DOCUMENTS

| CN | 101763166 A | 6/2010 |
| CN | 102498460 A | 6/2012 |

(Continued)

*Primary Examiner* — Patrick F Marinelli
(74) *Attorney, Agent, or Firm* — Hawaii Patent Services; Nathaniel K. Fedde; Kenton N. Fedde

(57) ABSTRACT

Provided is a touch panel apparatus capable of easily setting a touch sense produced by oscillatory waves of plural piezoelectric elements according to a user's taste. To this end, a touch sense pattern table (51) stores a plurality of touch sense pattern values made up of plural parameter values of a voltage table (52), plural parameter values of a frequency table (53), and plural parameter values of a phase difference table (54). A vibration diving control part (18) applies a driving signal to the piezoelectric elements of first to third groups to vibrate the touch panel (12) based on the parameter values acquired from the voltage table (52), the parameter values acquired from the frequency table (53), and the parameter values acquired from the phase difference table (54), correspondingly to the plurality of the touch sense patterns stored in the touch sense pattern table 51.

6 Claims, 14 Drawing Sheets

(51) Int. Cl.
*G06F 3/01* (2006.01)
*H04N 1/00* (2006.01)

(52) U.S. Cl.
CPC ....... *G06F 3/0488* (2013.01); *H04N 1/00392* (2013.01); *G06F 2203/014* (2013.01)

(56) References Cited

U.S. PATENT DOCUMENTS

| | | | | |
|---|---|---|---|---|
| 9,335,822 | B2* | 5/2016 | Olien | G06F 3/016 |
| 9,389,687 | B2* | 7/2016 | Kono | G06F 3/016 |
| 2009/0091479 | A1* | 4/2009 | Sinha | G06F 3/016 341/22 |
| 2010/0231367 | A1 | 9/2010 | Cruz-Hernandez et al. | |
| 2011/0115709 | A1 | 5/2011 | Cruz-Hernandez et al. | |
| 2011/0260990 | A1 | 10/2011 | Ali et al. | |
| 2012/0194460 | A1 | 8/2012 | Kuwabara et al. | |
| 2013/0038603 | A1* | 2/2013 | Bae | G06F 3/016 345/419 |
| 2013/0201137 | A1* | 8/2013 | Kono | G06F 3/016 345/173 |
| 2013/0201138 | A1* | 8/2013 | Kono | G06F 3/016 345/173 |
| 2013/0207918 | A1* | 8/2013 | Kono | G06F 3/016 345/173 |
| 2013/0207919 | A1* | 8/2013 | Kono | G06F 3/016 345/173 |
| 2014/0320431 | A1* | 10/2014 | Cruz-Hernandez | G06F 3/041 345/173 |
| 2014/0362014 | A1* | 12/2014 | Ullrich | G06F 3/0416 345/173 |
| 2015/0153887 | A1* | 6/2015 | Kim | G06F 3/044 345/173 |
| 2015/0241970 | A1* | 8/2015 | Park | G06F 3/016 345/173 |
| 2016/0110014 | A1* | 4/2016 | Aono | G06F 3/0488 345/173 |
| 2016/0202762 | A1* | 7/2016 | Tomaru | B60R 11/02 345/173 |

FOREIGN PATENT DOCUMENTS

| | | | |
|---|---|---|---|
| CN | 102591512 A | 7/2012 | |
| EP | 2202619 A | 6/2010 | |
| EP | 2202623 A | 6/2010 | |
| JP | 2005-085201 A | 3/2005 | |
| JP | 2005-149385 A | 6/2005 | |
| JP | 2006-163579 A | 6/2006 | |
| JP | 2007-011785 A | 1/2007 | |
| JP | WO 2012014386 A1 * | 2/2012 | ............ G06F 3/016 |
| WO | WO2010105004 | 9/2010 | |
| WO | WO2011062895 | 5/2011 | |
| WO | WO2013186847 | 12/2013 | |

* cited by examiner

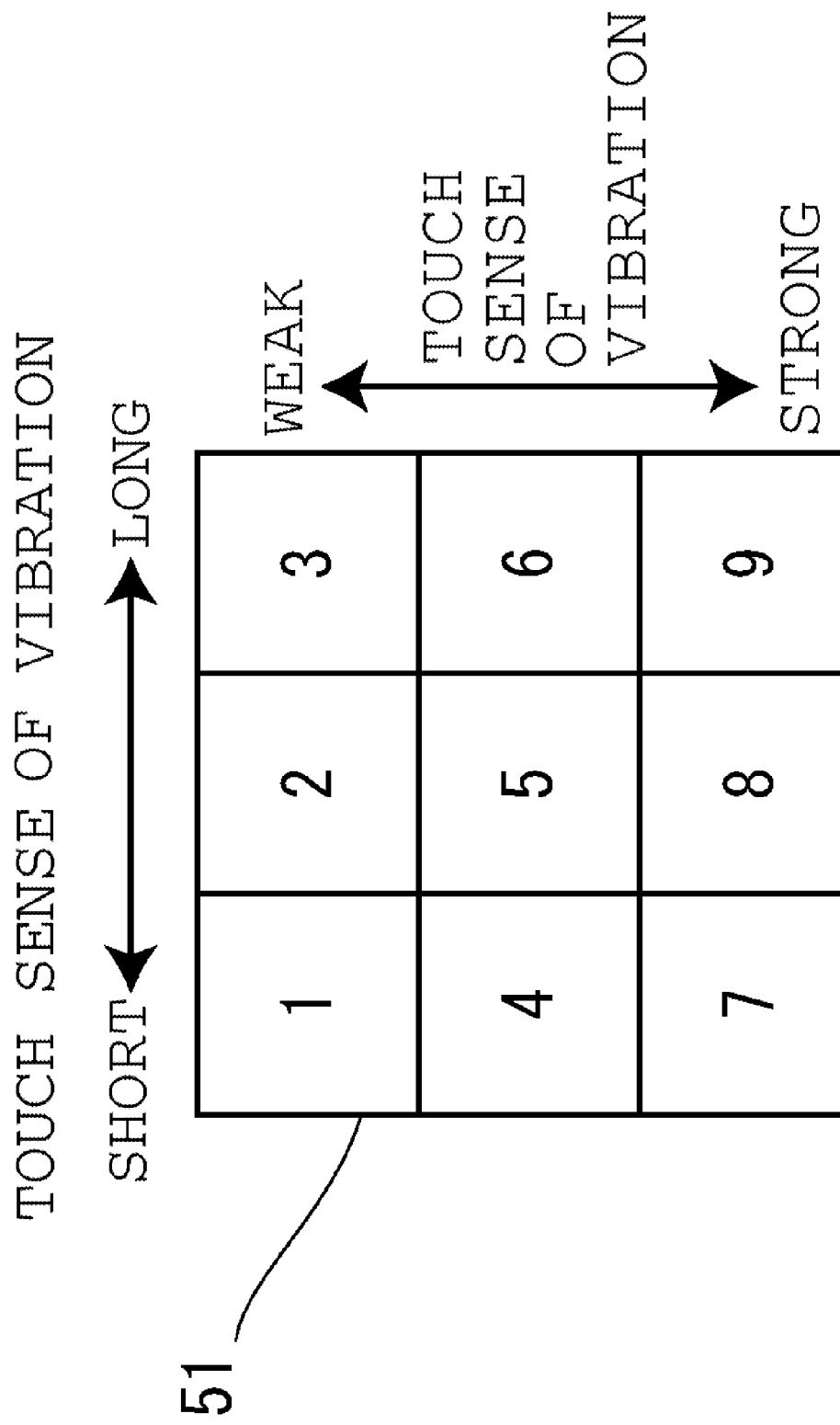

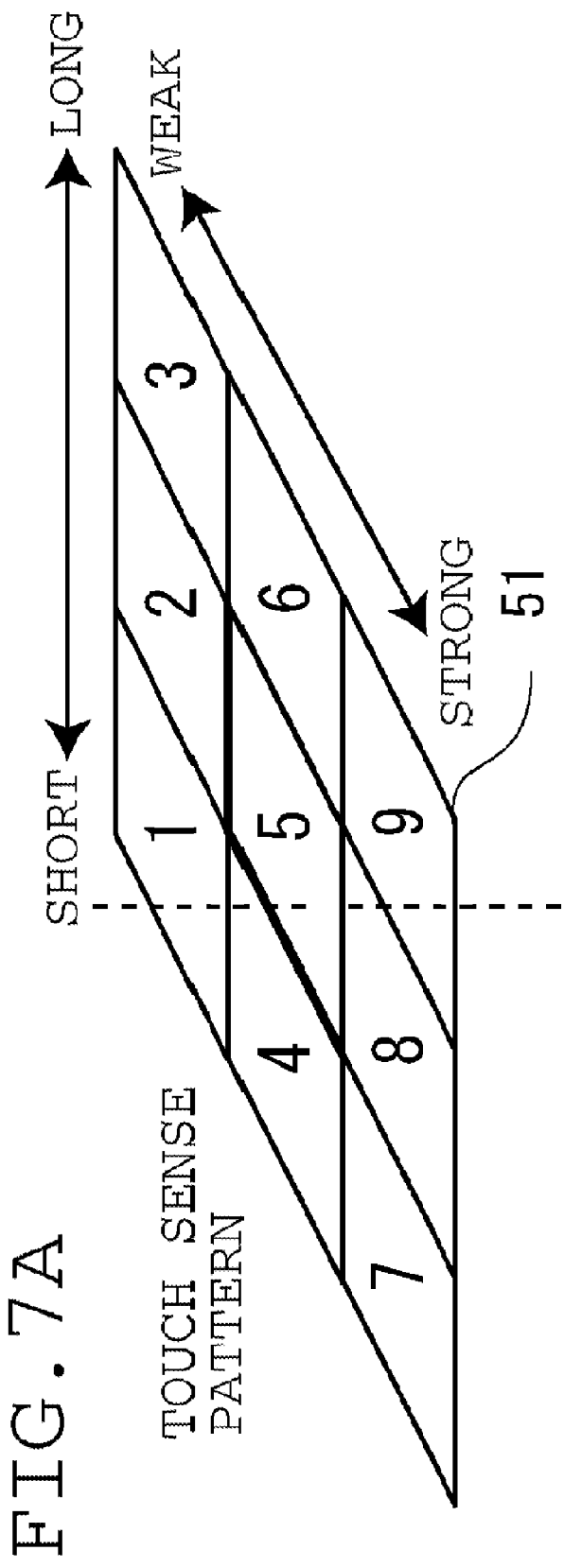

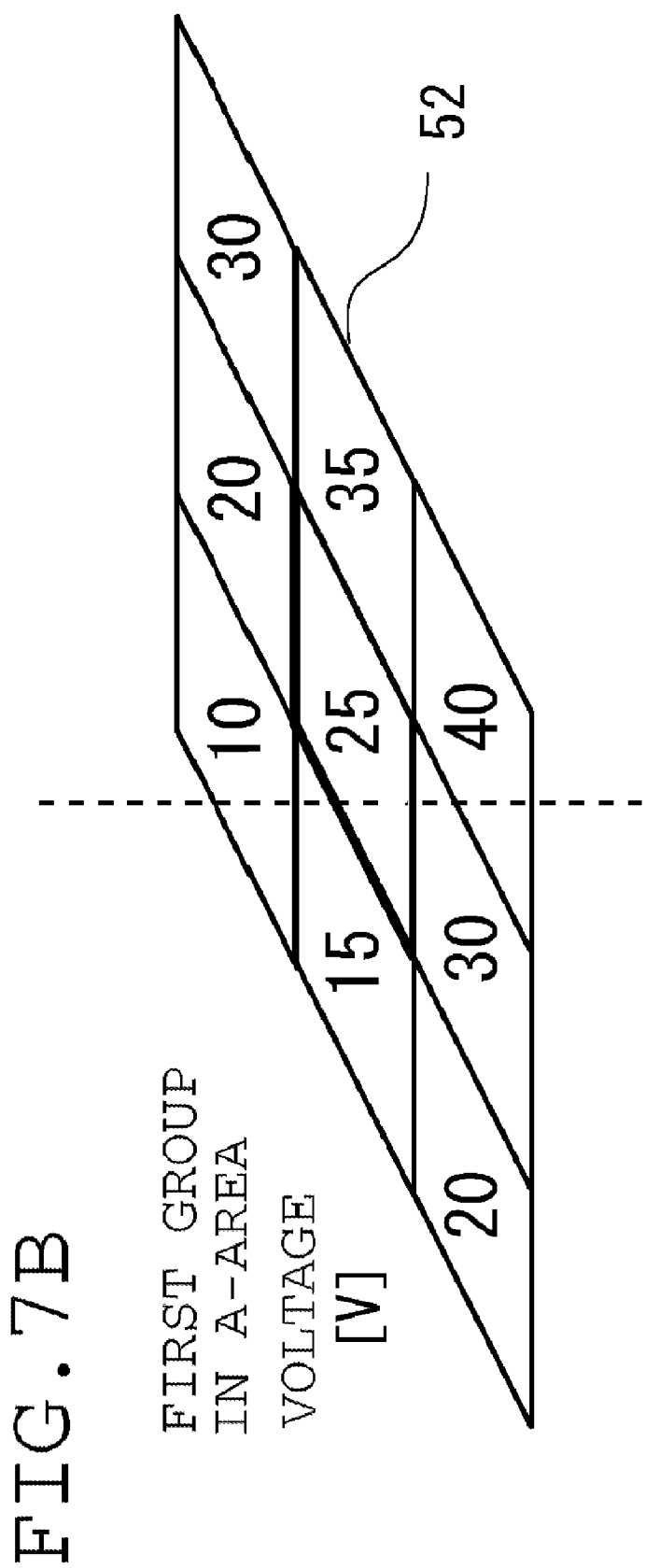

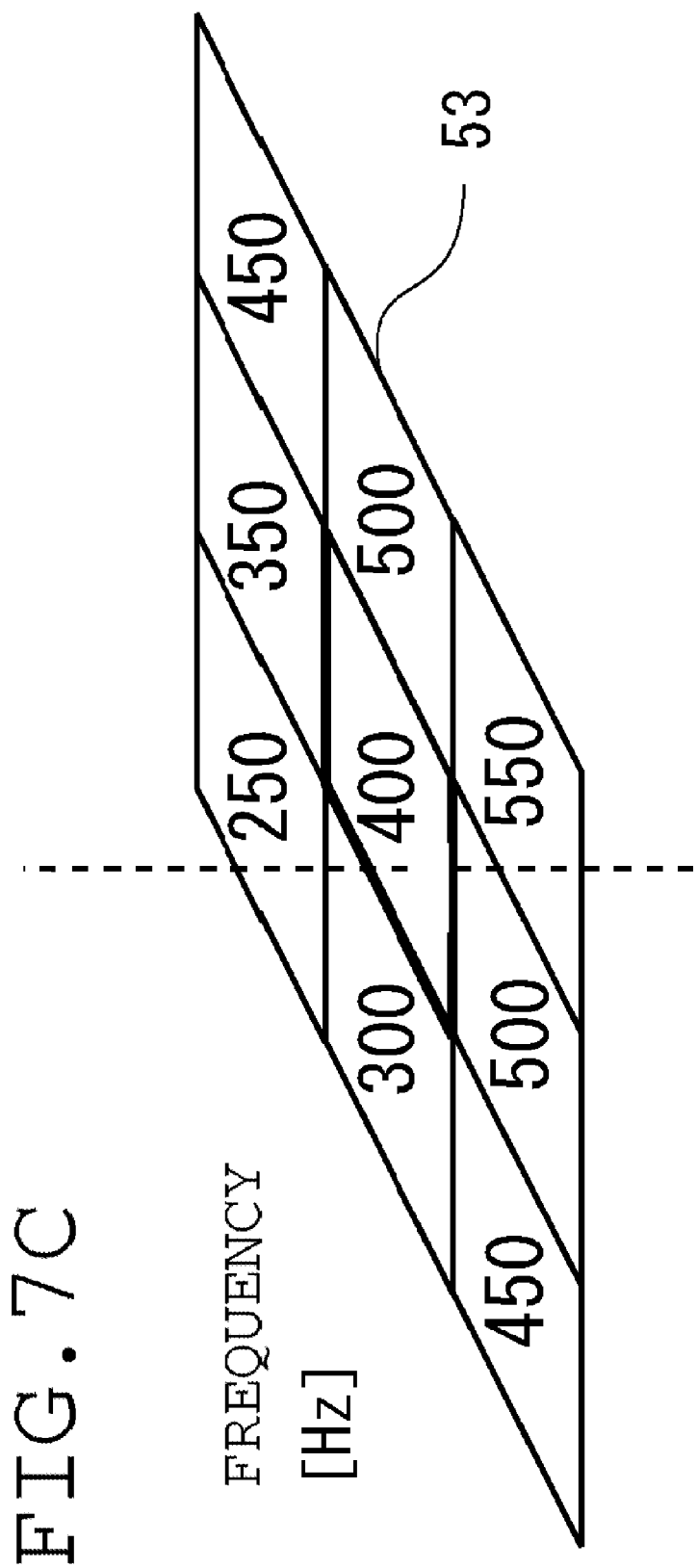

EACH PARAMETER VALUE OF TOUCH SENSE PATTERN "5"

A-AREA

| PIEZOELECTRIC ELEMENTS | VOLTAGE | FREQUENCY | PHASE DIFFERENCE |
|---|---|---|---|
| FIRST GROUP | 25V | 400Hz | 2ms |
| SECOND GROUP | 30V | 400Hz | 1ms |
| THIRD GROUP | 40V | 400Hz | 0ms |

FIG. 8A

EACH PARAMETER VALUE OF TOUCH SENSE PATTERN "5"

B-AREA

| PIEZOELECTRIC ELEMENTS | VOLTAGE | FREQUENCY | PHASE DIFFERENCE |
|---|---|---|---|
| FIRST GROUP | 30V | 400Hz | 0mS |
| SECOND GROUP | 20V | 400Hz | 1mS |
| THIRD GROUP | 30V | 400Hz | 0mS |

FIG. 8B

EACH PARAMETER VALUE OF TOUCH SENSE PATTERN "5"

C-AREA

| PIEZOELECTRIC ELEMENTS | VOLTAGE | FREQUENCY | PHASE DIFFERENCE |
|---|---|---|---|
| FIRST GROUP | 40V | 400Hz | 0ms |
| SECOND GROUP | 30V | 400Hz | 1ms |
| THIRD GROUP | 25V | 400Hz | 2ms |

FIG.8C

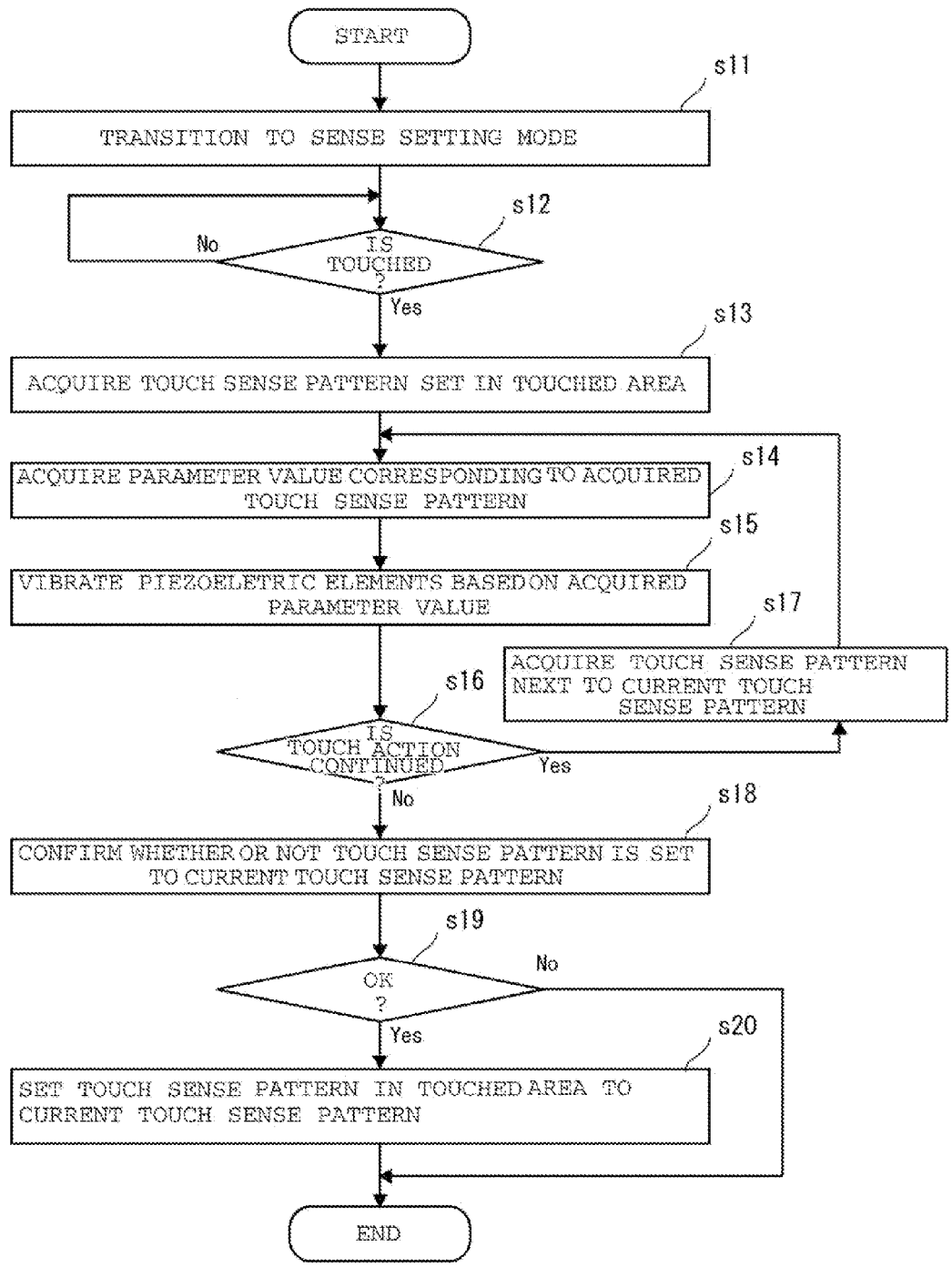

TOUCH PANEL APPARATUS AND TOUCH PANEL CONTROL METHOD

FIELD OF THE INVENTION

The present invention relates to a touch panel apparatus having a touch panel provided on a display part and a touch panel control method, and in particular to a touch panel apparatus having a function of vibrating the touch panel and feeding a touch sense back to a user and a touch panel control method.

Recently, there has been widespread a touch panel apparatus having a touch panel provided on a display part. In such a touch panel apparatus, when the touch panel apparatus detects that an operation key displayed on the display part is touched through the touch panel, a process is executed depending on which key is touched.

Since in the touch panel apparatus, no touch sense is got when an operation key is pressed, it has been widely prevailing to exercise ingenuity therein in which piezoelectric elements are provided in the touch panel, the touch panel is vibrated by applying a driving signal to the piezoelectric elements when a user touches an operation surface of the touch panel, and a touch sense is fed back to the user (See, for example, Patent Documents 1 to 3).

PRIOR ART DOCUMENT

Patent Document

Patent Document 1: JP P2005-149385 A
Patent Document 2: JP P2005-085201 A
Patent Document 3: JP P2007-0117785 A

SUMMARY OF THE INVENTION

Problem to be Solved by the Invention

In the interim, when plural piezoelectric elements are vibrated, interference occurs in oscillatory waves of the plural piezoelectric elements on the touch panel, resulting in vibrations depending on where a user touched. Further, every user has its own sense, and a user sometimes may feel uncomfortable with vibrations by preset vibration patterns. However, the prior art could not have been easily set a touch sense generated by oscillatory waves of the plural piezoelectric elements according to a user's taste.

The present invention is made in light of the aforementioned problem, and an object thereof is to provide a technology capable of solving the aforementioned problem.

Means for Solving the Problem

A touch panel apparatus provided on a display surface of a display part and having a touch panel receiving an operation, the touch panel apparatus comprising a plurality of piezoelectric elements that vibrate the touch panel; a vibration control part that drives the plural piezoelectric elements based on a set parameter value of a first parameter, a set parameter value of a second parameter, and a set parameter value of a third parameter; a first parameter table that stores a plurality of the parameter values of the first parameter; a second parameter table that stores a plurality of the parameter values of the second parameter; a third parameter table that stores a plurality of the parameter values of the third parameter; a touch sense pattern table that stores a plurality of touch sense pattern values made up of a combination of the plurality of the parameter values of the first parameter, the plurality of the parameter values of the second parameter, and the plurality of the parameter values of the third parameter; and a setting part that sets the parameter value of the first parameter, the parameter value of the second parameter, and the parameter value of the third parameter based on the plurality of the touch sense pattern values stored in the touch sense pattern table.

A touch panel control method executed by a touch panel apparatus including a touch panel provided on a display surface of a display part and receives an operation, and a plurality of piezoelectric elements vibrating the touch panel, the touch panel control method comprising the steps of driving the plurality of the piezoelectric elements based on a set parameter value of a first parameter, a set parameter value of a second parameter, and a set parameter value of a third parameter; and setting the parameter value of the first parameter, the parameter value of the second parameter, and the parameter value of the third parameter based on a plurality of touch sense pattern values which are made up of a combination of a plurality of parameter values of the first parameter stored in a first parameter table, a plurality of parameter values of the second parameter stored in a second parameter table, and a plurality of parameter values of the third parameter stored in a third parameter table, and are stored in a touch sense pattern table.

Effects of the Invention

According to the present invention, the invention allows a technology to be provided which is capable of easily setting a touch sense generated by oscillatory waves of the piezoelectric elements according to a user's taste.

BRIEF DESCRIPTION OF THE DRAWINGS

FIG. 6 shows one example of a touch sense pattern table stored in a memory part shown in FIG. 4;

FIG. 7A shows one example of a touch sense pattern table stored in the memory part shown in FIG. 4;

FIG. 7B shows one example of a voltage table stored in the memory part shown in FIG. 4;

FIG. 7C shows one example of a frequency table stored in the memory part shown in FIG. 4;

FIG. 8A shows one example of a parameter value corresponding to a touch sense pattern "5" shown in FIG. 6;

FIG. 8B shows one example of a parameter value corresponding to the touch sense pattern "5" shown in FIG. 6;

FIG. 8C shows one example of a parameter value corresponding to the touch sense pattern "5" shown in FIG. 6; and FIG. 9 shows a flow chart indicating a flow of processes for setting the touch sense patterns of the touch panel shown in FIG. 4.

MODES FOR CARRYING OUT THE INVENTION

Next, an exemplary embodiment of the present invention will be described in detail with reference to the accompanying drawings.

Figure 1:
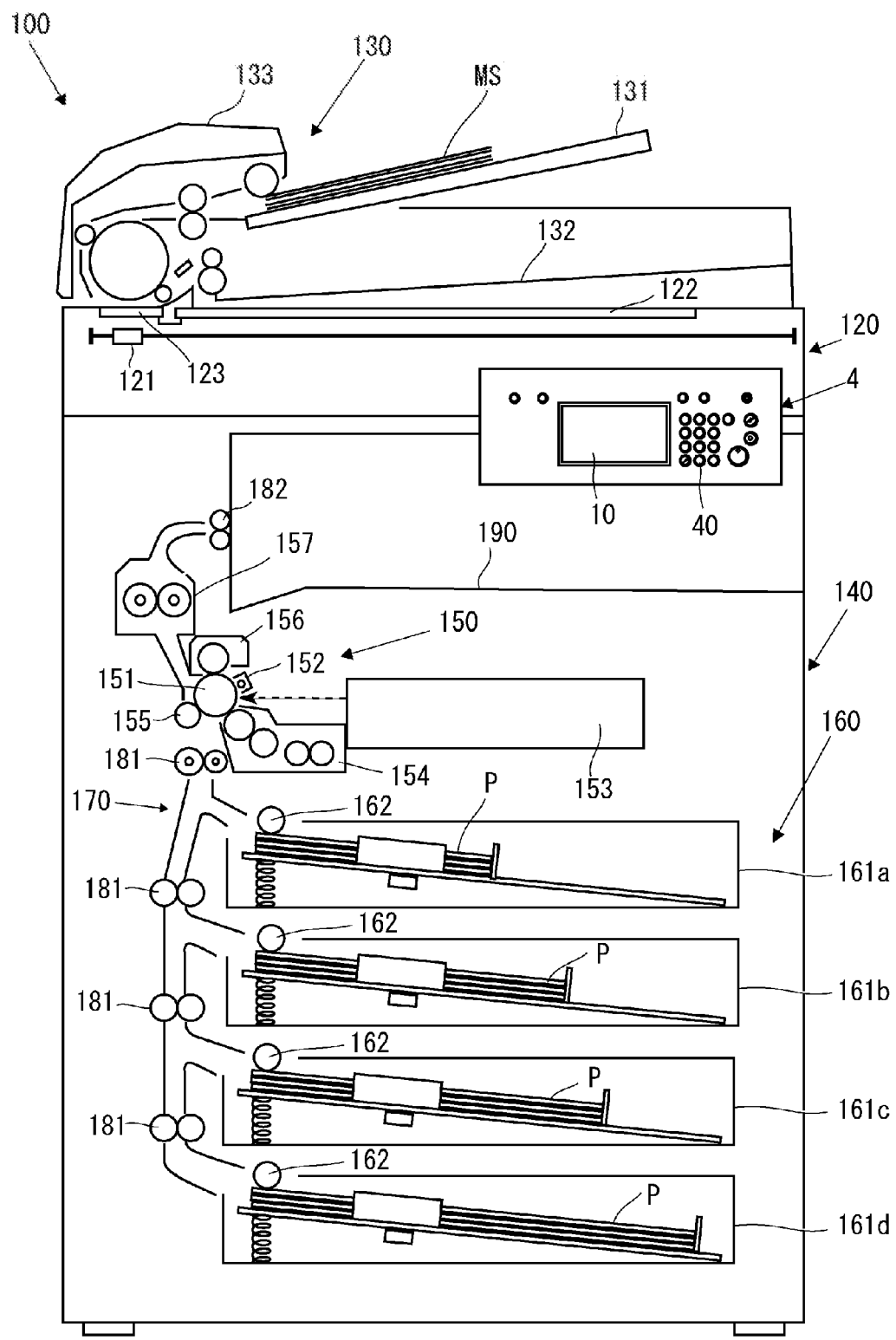
FIG. 1 is a cross-sectional schematic diagram of an image forming apparatus according to the present invention.

An image forming apparatus 100 on which a touch panel apparatus 10 according to the present embodiment is mounted is a copying machine, and includes, referring to FIG. 1, a manuscript reading part 120, a manuscript feeding part 130, and a recording part 140. The manuscript reading part 120 is provided on an upper part of the recording part 140 and the manuscript feeding part 130 is provided on an upper part of the manuscript reading part 120. Incidentally, while the present embodiment will be described by taking a copying machine as an example, it is needless to say that the image forming apparatus 100 may include a scanner and the copying machine, or the like.

Figure 2:
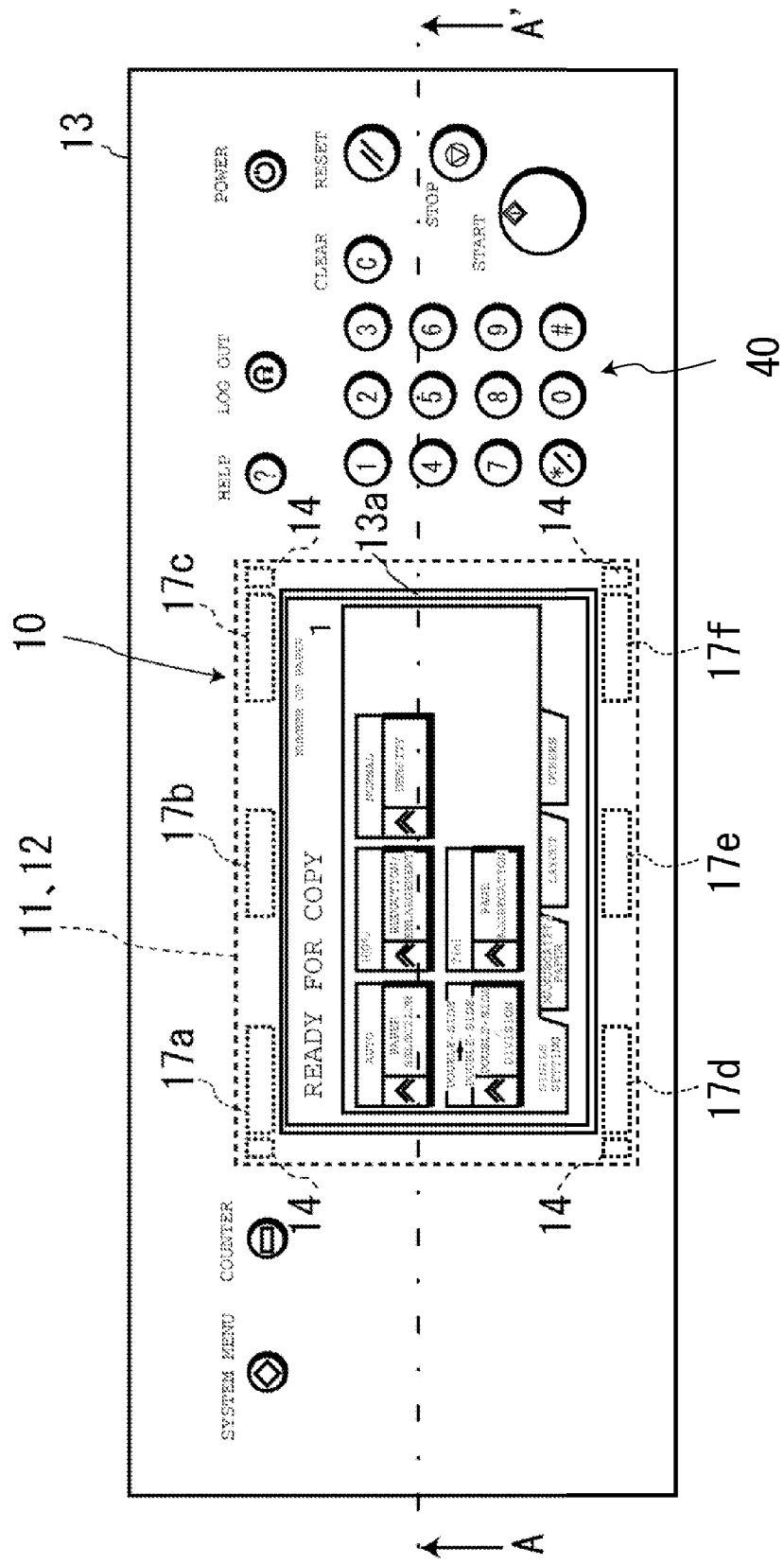
FIG. 2 is a plain view showing a configuration example of a touch panel apparatus shown in FIG. 1.
Figure 3:
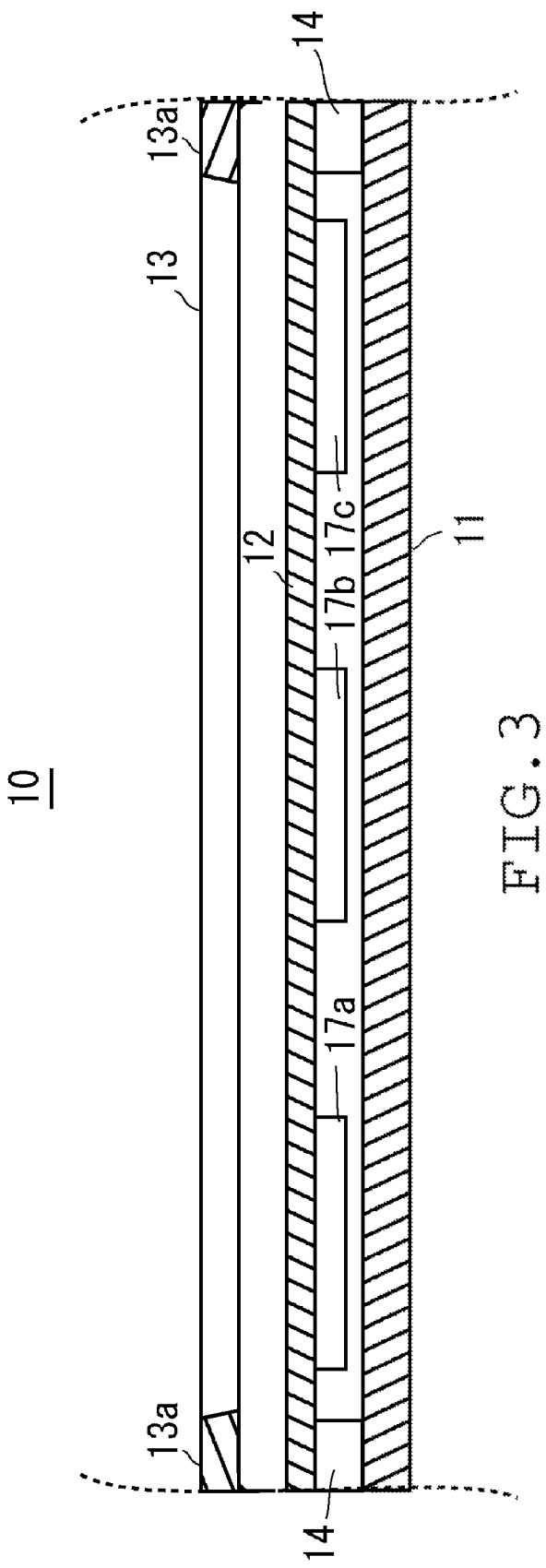
FIG. 3 is a cross-sectional view taken along line A-A' shown in FIG. 2.

At a front side of the image forming apparatus 100, there is provided an operation part 4 performing settings of the image forming apparatus 100 and giving an operation instruction thereto. The operation part 4 is provided with the touch panel apparatus 10 and an operation button 40. It is to be noted that whereas a description will be made here by giving the touch panel apparatus 100 using a touch panel 12 as an example by way of example of an operation panel, not necessarily limited to the touch panel 12, any operation panel apparatus may be available with an operation panel, such as a touch panel not having a substantive pushing-down stroke. Referring to FIG. 2 and FIG. 3, the touch panel apparatus 10 includes a display part 11 displaying various operation keys for receiving an operation input and a touch panel 12 which is arranged on a display surface of the display part 11, and detects a touch input by an operator's finger, or by a pressing force of a stylus or the like, and receives an operation to an operation key displayed on the display part 11 by outputting a signal corresponding to a position at which the touch input is detected. The display part 11 and the touch panel 12 have a rectangular shape which is formed to have a substantially identical shape, and whose short side is arranged in a vertical direction and long side is arranged in a horizontal direction. Further, as the display part 11, a liquid crystal display panel may be used, for example. As the touch panel 12, a resistance film type and a capacitive type may be used, for example.

The display part 11 is accommodated and held in a housing 13 and the housing 13 is provided with an upper cover 13a covering a peripheral region of the display part 11 and the touch panel 12. The touch panel 12 is held on the display part 11 via a plurality of elastic members 14 provided on a portion covered by the upper cover 13a. The elastic elements 14 are made of resin such as rubber or the like, and an upper surface of the elastic members 14 serves as a fixing surface for fixing the touch panel 12. An adhesive agent applied on the upper surface of the elastic members 14 fixes the touch panel 12.

On a back surface of the touch panel 12, piezoelectric elements 17a-f are adhered at a portion covered by the upper cover 13a. The piezoelectric elements 17a-f function as a vibration part vibrating the touch panel 12. In the present embodiment, the piezoelectric elements 17a-c and the piezoelectric elements 17d-f are arranged at a portion covered by the upper cover 13a opposed to one another in a short side direction. Each of the opposing piezoelectric elements 17a and 17d, the opposing piezoelectric elements 17b and 17e, and the opposed piezoelectric elements 17c and 17f is arranged as a pair of groups, respectively. In the present embodiment, a pair of the piezoelectric elements 17a and 17d, a pair of the piezoelectric elements 17b and 17e, and a pair of the opposing piezoelectric elements 17c and 17f are called as a first group, a second group, and a third group, respectively. It is to be noted that the number of group and the installing positions of the piezoelectric elements may be appropriately changed.

The operation button 40 is provided with various operation keys, such as a numeric key for inputting a value of the number of print or the like, a reset key for inputting an instruction to initialize setting information, a stop key for stopping a copy operation and deleting an input value, and a start key for inputting an output instruction to start a print job.

Referring to FIG. 1, the manuscript reading part 120 includes a scanner 121, a platen glass 122, and a manuscript reading slit 123. The scanner 121 is made up, for example, of a LED and a CCD (Charge Couple Device) sensor or the like and is configured to be movable in a conveying direction of a manuscript MS by the manuscript feeding part 130. The platen glass 122 is a platen formed of a transparent member such as glass. The manuscript reading slit 123 has a slit formed in a direction orthogonal to the conveying direction of the manuscript MS by the manuscript feeding part 130.

In a case where the manuscript MS placed on the platen glass 122 is read, the scanner 121 is moved to a position opposed to the platen glass 122 and reads the manuscript MS while scanning the manuscript MS placed on the platen glass 122 to acquire image data of the manuscript MS, and outputs the acquired image data to a recording part 130. Meanwhile, in a case where the manuscript MS conveyed by the manuscript feeding part 130 is read, the scanner 121 is moved to a position opposed to the manuscript reading slit 123 and reads the manuscript MS through the slit 123 in synchronization with a conveying operation of the manuscript MS by the manuscript feeding part 130 to acquire image data of the manuscript MS, and outputs the acquired image data to the recording part 140.

The manuscript feeding part 130 includes a manuscript mounting part 131, a manuscript discharging part 132, and a manuscript conveying mechanism 133. The manuscript MS placed on the manuscript mounting part 131 is successively delivered in order one by one by the manuscript conveying mechanism 133 to a position opposite to the manuscript reading slit 123 of the manuscript reading part 120, and is then discharged into the manuscript discharging part 132. It is to be noted that the manuscript feeding part 130 is configured to be foldable and to be able to open an upper surface of the platen glass 122 by lifting the manuscript feeding part 130 in an upward direction.

The recording part 140 includes an image forming part 150, a paper feeding part 160, a conveying path 170, conveying rollers 181, discharging rollers 182, and a discharging tray 190.

The paper feeding part 160 includes a plurality of paper feeding cassettes 161a-161d storing therein a recording paper P and a plurality of paper feeding rollers 162 delivering the recording paper P to the conveying path 170 one by one from the paper feeding cassettes 161a-161d. The paper feeding rollers 162, the conveying rollers 181, and the discharging rollers 182 function as a conveying part, through which the recording paper P is conveyed. The recording paper P delivered by the feeding rollers 162 to the conveying path 170 is conveyed by the conveying rollers 181 to the image forming part 150. Then, the recording paper P on which recording is applied by the image forming part 150 is discharged outside the apparatus by the discharging rollers 182. The recording paper P on which the recording is applied by the image forming part 150 is guided to the discharging rollers 182 and is discharged into the discharging tray 190.

The image forming part 150 includes a photosensitive drum 151, a charging part 152, an exposure part 153, a developing part 154, a transfer part 155, a cleaning part 156, and a fixing part 157. The exposure part 153 is an optical unit provided with a laser device, and a mirror or the like, which outputs a laser beam based on the image data, exposes a surface of the photosensitive drum 151 electrically charged by the charging part 152, and forms an electrostatic latent image on the surface of the photosensitive drum 151. The developing part 154 is a developing unit for developing an electrostatic latent image formed on the surface of the photosensitive drum 151 using toner, and forms a toner image on the photosensitive drum 151 based on the electrostatic latent image. The transfer part 155 transfers a toner image formed on the photosensitive drum 151 by the developing part 154 on the recording paper P. The cleaning part 156 removes toner remained on the photosensitive drum 151 after transfer. The fixing part 157 heats the recording paper P on which the toner image is transferred by the transfer part 155 and fixes the toner image on the recording paper P.

Figure 4:
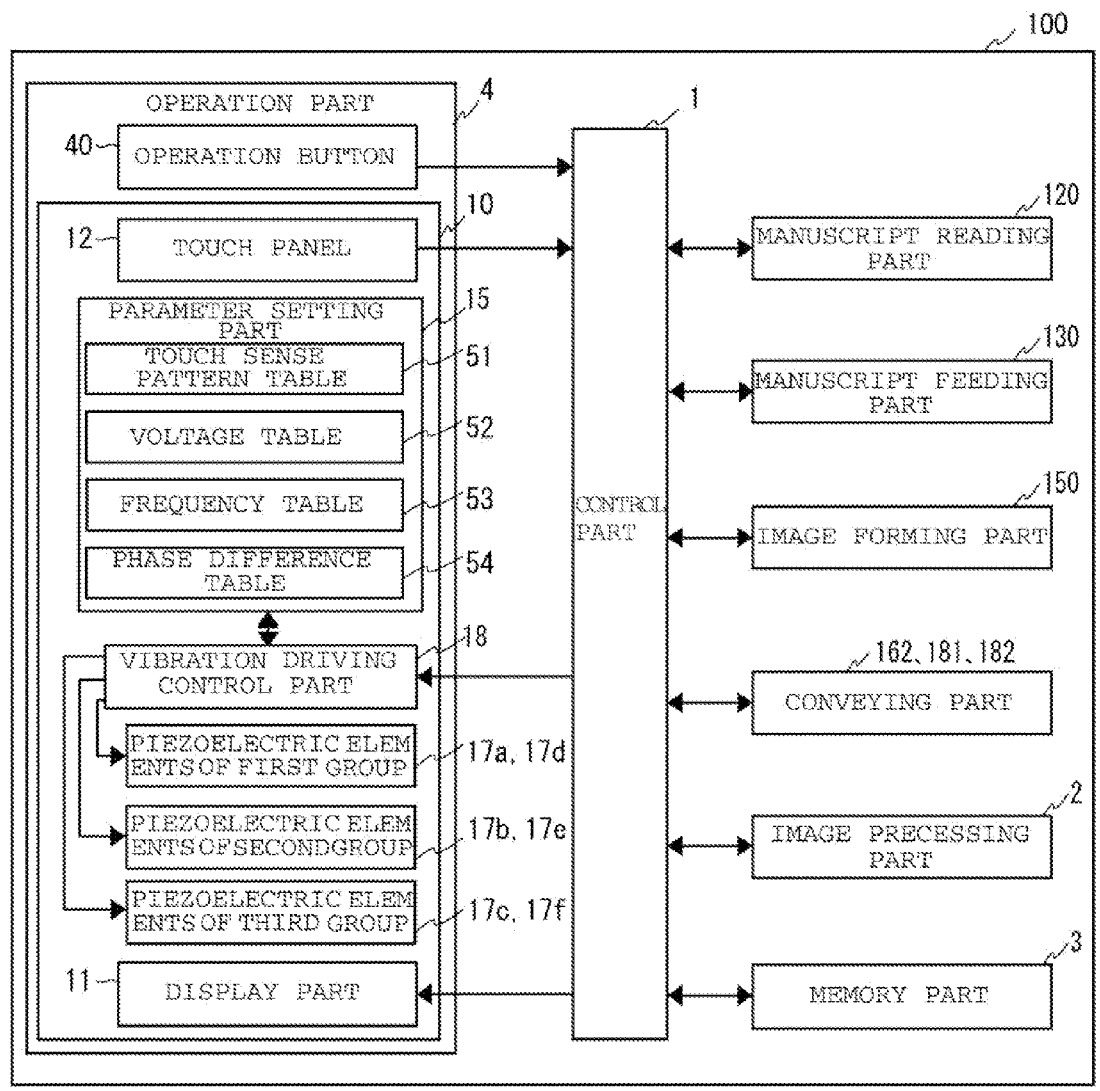
FIG. 4 is a block diagram indicating a schematic configuration of the image forming apparatus shown in FIG. 1.

Next, a schematic configuration of the image forming apparatus 1 will be described with reference to FIG. 4.

The touch panel apparatus 10, the manuscript reading part 120, the manuscript feeding part 130, the image forming part 150, and the conveying part (feeding rollers 162, conveying rollers 181, and discharging rollers 182) of the image forming apparatus 100 are connected to a control part 1 and operation control of these parts are performed thereby. Further, the image processing part 2 and the memory part 3 are connected to the control part 1.

The control part 1 is an information processor such as a microcomputer with a Read Only Memory (ROM), a Random Access Memory (RAM), or the like. The ROM stores control programs for performing operation control of the image forming apparatus 100. The control part 1 reads out the control programs stored in the ROM, and develops the control programs to the RAM, thereby controlling the entire apparatus on the RAM in response to predetermined instruction information or the like input from the touch panel apparatus 180.

The image processing part 2 is a control computing part for performing predetermined image processing to image data, and performing image improvement processing, such as scaling, a density adjustment, and a tone adjustment.

The memory part 150 is a storage medium such as a semiconductor memory and a Hard Disk Drive (HDD), and stores image data acquired by reading a manuscript by the manuscript reading part 120.

The touch panel apparatus 10 is provided with a parameter setting part 15 for setting parameters of the piezoelectric elements 17a-f and a vibration driving control part 18 for driving the piezoelectric elements 17a-f based on an instruction from the control part 1. The vibration driving control part 18 applies a driving signal to each of the piezoelectric elements 17a-f based on parameter values set by the parameter setting part 15 to thereby cause the piezoelectric elements 17a-f to vibrate for eventually vibrating the touch panel 12. The driving signal is applied to the piezoelectric elements 17a-f every first to third groups. The vibration driving control part 18 vibrates the touch panel 12 in nine types of touch sense patterns by changing an applied voltage, a frequency, and a phase of the driving signal every first to third groups based on the parameter values set by the parameter setting part 15 for the respective piezoelectric elements 17a-f.

Figure 5:
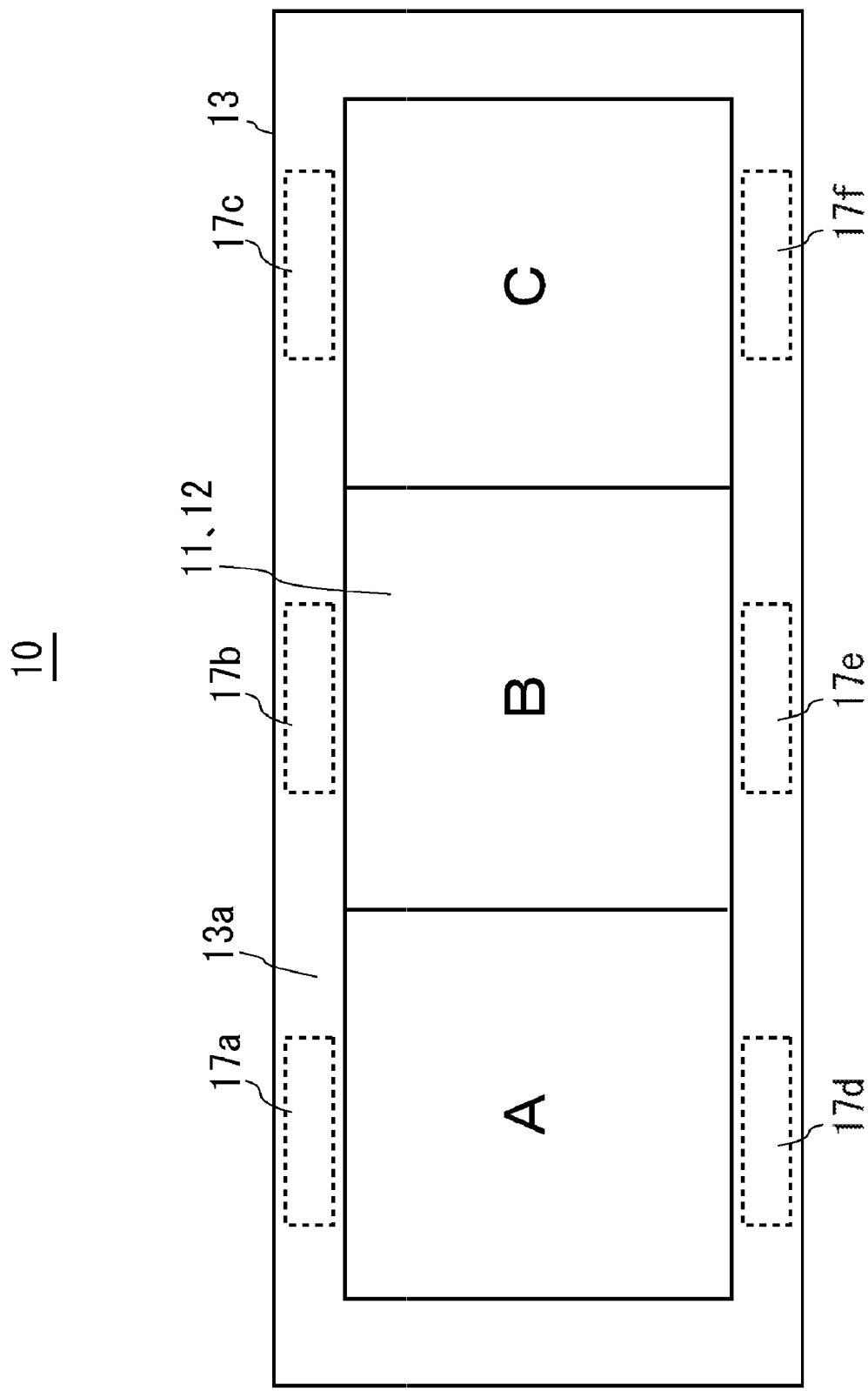
FIG. 5 is a view showing a setting reference area of the touch panel shown in FIG. 2.

When the piezoelectric elements 17a-f are individually vibrated by the vibration driving control part 18, vibrations of the piezoelectric elements 17a-f interfere on the touch panel 12, variations occur in the strength of vibration depending on a touched position on the touch panel 12. For this reason, in the present embodiment, as shown in FIG. 5, the embodiment is configured to provide three setting reference areas i.e., an A-area, a B-area, and a C-area to allow the touch sense pattern to be set when touched for each of the setting reference areas.

The parameter setting part 15 is provided with a touch sense pattern table 51, a voltage table 52, a frequency table 53, and a phase difference table 54.

FIG. 6 is one example of the touch sense pattern table 51 in which touch sense patterns 1-9 are placed. In the touch sense pattern table 51, the touch sense patterns 1-9 are placed in a matrix form. Each of the touch sense patterns 1-9 indicates the time length during which a user feels a vibration (length of vibration) and the strength at which a user feels a touch sense (strength of vibration) by a combination of the parameter values of the voltage table 52, the frequency table 53, and the phase difference table 54. It is preferable to set the voltage table 52, the frequency table 53, and the phase difference table 54 such that as the touch sense pattern proceeds 1→2→3, 4→5→6, and 7→8→9, the time length during which a user feels a vibration becomes longer and the touch sense pattern proceeds 1→4→7, 2→5→8, and 3→6→9, and the strength at which a user feels a vibration becomes stronger. It is to be noted that in the touch sense pattern table 51 shown in FIG. 6, the touch sense patterns are placed such that a horizontal axis indicates the length of the touch sense and a vertical axis indicates the strength of the touch sense. In this connection, the touch sense patterns are not necessarily arranged in a matrix form, instead, the touch sense patterns may be placed, for example, such that as the touch sense pattern proceeds 1→9, the time length during which a user feels a vibration becomes longer and the strength at which a user feels a vibration becomes stronger.

There are provided the piezoelectric elements of the first group, the voltage table 52, the frequency table 53, and the phase difference table 54 for the piezoelectric elements of the first group for each of the setting reference area A, B, and C correspondingly to the touch sense pattern table 51. Similarly, there are provided the voltage table 52, and the frequency table 53, and the phase difference table 54 for the piezoelectric elements of the second group for each of the setting reference areas A, B, and C, and there are provided the voltage table 52, the frequency table 53, and the phase difference table 54 for the piezoelectric elements of the third group for each of the setting reference areas A, B, and C. The voltage table 52 is a table where voltages of a driving signal are varied, while the frequency table 53 is a table where frequencies of the driving signal are varied. Further, the phase difference table 54 is a table where timings (delayed time) at which a driving signal is applied are varied so as to produce a phase difference between the oscillatory waves of the piezoelectric elements 17a-f.

Figure 7D:
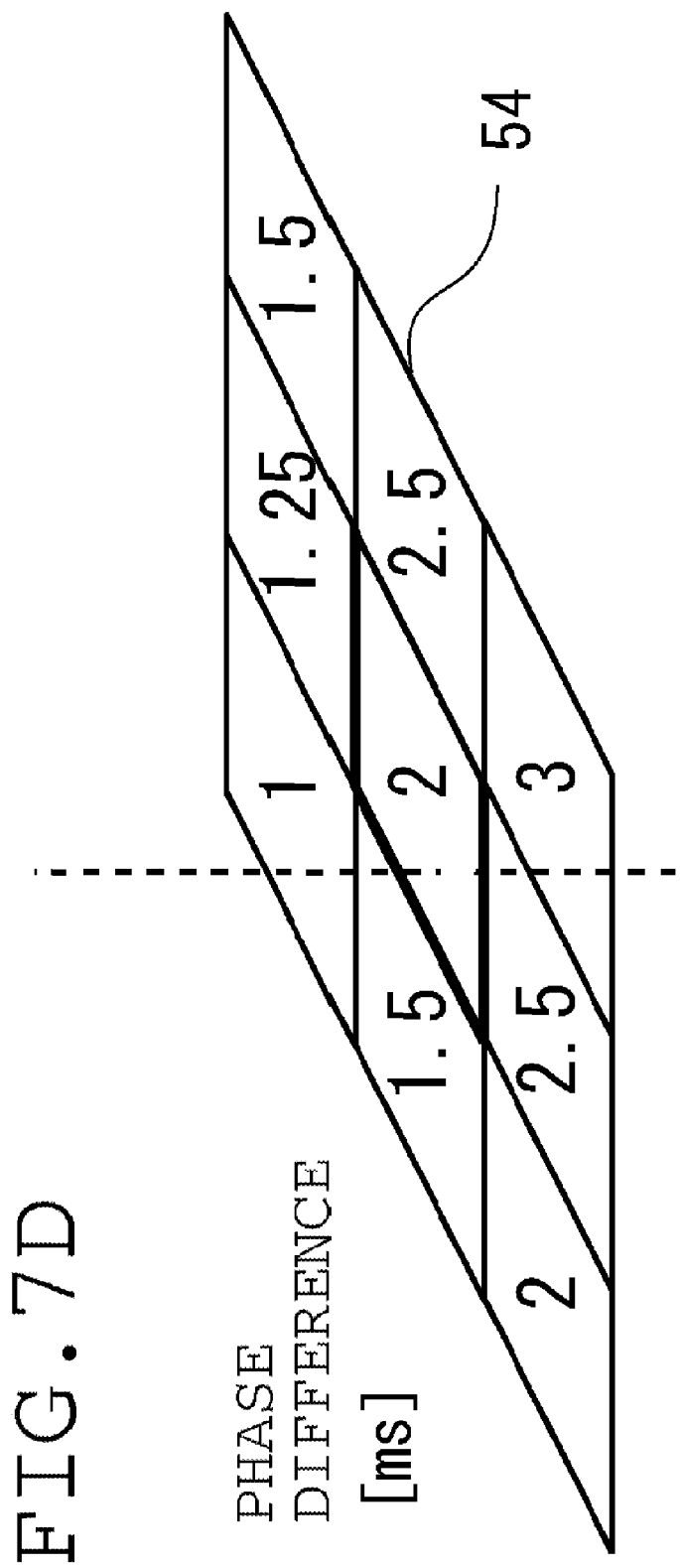
FIG. 7D shows one example of a phase difference table stored in the memory part shown in FIG. 4.

For example, FIG. 7 shows the voltage table 52, the frequency table 53, and the phase difference table 54 for the piezoelectric elements of the first group in the A-area. FIG. 7A shows the touch sense pattern table 51, FIG. 7B shows the voltage table 52, FIG. 7C shows the frequency table 53, and FIG. 7D shows the phase difference table 54. In each of the voltage table 52, the frequency table 53, and the phase difference table 54, there are placed nine parameter values in a matrix form correspondingly to the touch sense table 51.

For example, in the case of a touch sense pattern "5", "25V" of the voltage table 52, "400 Hz" of the frequency table 53, and "2 ms" of the phase difference table 54 are parameter values for a driving signal of the first group in the A-area correspondingly to a location of the "5".

Similarly, there are provided the voltage table 52, the frequency table 53, and the phase difference table 54 in the A-area for each of the piezoelectric elements of the second and third groups, correspondingly to the touch sense pattern table 51. Also, there are provided the voltage table 52, the frequency table 53, and the phase difference table 54 in the B-area and the C-area for each of the piezoelectric elements of the first to third groups correspondingly to the touch sense pattern table 51.

FIG. 8A, FIG. 8B, and FIG. 8C show one example of parameter values of the piezoelectric elements of the first to third groups in each of the A-area, the B-area, and the C-area. For example, in the case of the A-area, the vibration driving control part 18 applies a driving signal having a frequency of 400 Hz at a voltage of 25V to the piezoelectric elements of the first group with a phase difference of 2 ms relative to a driving signal to be applied to the piezoelectric elements of the third group, a driving signal having a frequency of 400 Hz at a voltage of 30V to the piezoelectric elements of the second group with a phase difference of 1 ms relative to the driving signal to be applied to the piezoelectric elements of the third group, and a driving signal having a frequency of 400 Hz at a voltage of 40V to the piezoelectric elements of the third group with no phase difference relative to the driving signal to be applied to the piezoelectric elements of the third group. Oscillatory waves generated by the piezoelectric elements of the first group, oscillatory waves generated by the piezoelectric elements of the second group, and oscillatory waves generated by the piezoelectric elements of the third group are synthesized in the A-area on the touch panel 12. The higher a voltage applied to the piezoelectric elements 17*a-f* becomes, the stronger a touch sense of the synthesized vibration waves becomes, and conversely, the lower the voltage applied to the piezoelectric elements 17*a-f* becomes, the weaker a touch sense of the synthesized vibration waves becomes. Further, the higher a frequency of the voltage applied to the piezoelectric elements 17*a-f* becomes, the harder a touch sense of the synthesized vibration waves becomes, and conversely, the lower the frequency of the voltage applied to the piezoelectric elements 17*a-f* becomes, the softer a touch sense of the synthesized vibration waves becomes. Moreover, the bigger a frequency difference of oscillatory waves of the piezoelectric elements 17*a-f* becomes, the longer a time during which a user feels a touch sense becomes, and conversely, the smaller the frequency difference of oscillatory waves of the piezoelectric elements 17*a-f* becomes, the shorter a time during which a user feels a touch sense becomes.

Next, a description will be made to a flow of the setting process of the touch sense patterns with reference to FIG. 9. Hereinbelow, a flow of the process will be described in a case where the control part 1 functions as the setting part for setting the touch sense patterns. It is needless to say that the setting part may be provided in the touch panel apparatus 10. Further, an assumption is made here that the touch sense patterns are previously set in each of the setting reference areas A-C. The touch sense patterns set in the setting reference areas A-C may be stored, for example, in the memory part 3.

If transitioned to a touch sense pattern setting mode (step s11) by an operation of a user, the control part 1 waits for until the touch panel 12 is touched (step s12), and if the touch panel is not touched (No in step 12), the process returns buck to step s12. Otherwise, if the touch panel is touched (Yes in step s12), the control part 1 controls the vibration driving control part 18 to acquire the touch sense patterns set in a touched area (step s13), and acquire the parameter values corresponding to the acquired touch sense patterns, respectively, with reference to the voltage table 52, the frequency table 53, and the phase difference table 54 for the piezoelectric elements of the first to third groups corresponding to the touched area (step s14). Then, the control part is controls the vibration driving control part 18 to cause the piezoelectric elements 17*a-f* to vibrate for a predetermined time based on the acquired parameter values (step s15).

Subsequently, the control part 1 determines whether or not a touch action is continued on the touch panel 12 (step S16), if the touch action is continued (Yes in step s16), the control part 1 controls the vibration driving control part 18 to acquire a touch sense pattern next to the current touch sense pattern with reference to the touch sense pattern table 51 (step s17), acquires the parameter values corresponding to the acquired touch sense pattern (step s14), and causes the piezoelectric elements 17*a-f* to vibrate for a predetermined time based on the acquired parameter values (step s15). The control part 1 repeats the processes steps 14 to step 17 while a touch action is continued (Yes in step 16). Thus, the touch sense pattern changes in order of 1→2→3→ . . . →8→9→1→2→3. A user can confirm in order a touch sense while feeling at the touched position by continuing a touch action.

If a user lifts off a finger from the touch panel 12, the control part 1 determines that a touch action is not continued (No in step s16) and the control part 1 causes the display part 11 to display a message requesting a user to confirm whether or not a touch sense action at the touched position is set to the current touch sense pattern (step s18). If an operation indicating "OK" is performed, such as touching the touch panel 12 (Yes in step 19), the control part 1 sets the touch sense pattern in the touched area to the current touch sense pattern (step s20), and terminates the procedure. Otherwise, if no operation indicating "OK" is performed (No in step s19), the control part 1 terminates the procedure without changing the setting of the touch sense pattern.

Thereby, when one of the areas A, B, and C is touched, the vibration driving control part 18 acquires the parameter values from the voltage table 52, the frequency table 53, and the phase difference table 54 for the piezoelectric elements of the first to third groups corresponding the touched area correspondingly to the touch sense pattern set in the touched area, and causes the piezoelectric elements 17*a-f* to vibrate based on the acquired parameter values.

As described above, the touch panel apparatus 10 according to the present embodiment includes the touch sense pattern table 51 for previously storing nine types of touch sense patterns acquired by a combination of the parameter values of each of the voltage table 52, the frequency table 53, and the phase difference table 54, and causes the piezoelectric elements 17*a-f* to vibrate based on the touch sense pattern selected by a user from among the touch sense patterns of the touch sense pattern table 51. For this reason, this eliminates the necessity for a user to finely set each of the parameter values, and allows a vibration to be easily set when the touch panel 12 is touched according to a user's taste. Further, changing the touch sense pattern makes it possible to prevent variations in element performance, variations in element mounting, and an influence by surrounding environments.

It needless to say that the present invention is not necessarily limited to the aforementioned embodiment, rather various modifications may be made without departing from the spirit and scope of the present invent n. For example, each of the aforementioned parameter values is a mere example, and therefore may be appropriately changed. For example, in a case where a touch sense pattern is "5", the parameters 17a-f of the phase difference table 54 may be set such that the piezoelectric elements are in phase with one another. Moreover, settings of a touch sense pattern may be stored for every user who logged in the image forming apparatus 100.

The invention claimed is:

1. A touch panel apparatus provided on a display surface of a display part and having a touch panel receiving an operation, the touch panel apparatus comprising:
    a plurality of piezoelectric elements that vibrate the touch panel;
    a vibration control part that drives the plural piezoelectric elements based on a set parameter value of a first parameter, a set parameter value of a second parameter, and a set parameter value of a third parameter;
    a first parameter table that stores a plurality of the parameter values of the first parameter;
    a second parameter table that stores a plurality of the parameter values of the second parameter;
    a third parameter table that stores a plurality of the parameter values of the third parameter;
    a touch sense pattern table that stores a plurality of touch sense pattern values made up of a combination of the plurality of the parameter values of the first parameter, the plurality of the parameter values of the second parameter, and the plurality of the parameter values of the third parameter; and
    a setting part that sets the parameter value of the first parameter, the parameter value of the second parameter, and the parameter value of the third parameter based on the plurality of the touch sense pattern values stored in the touch sense pattern table,
    wherein the vibration control part vibrates the plurality of the piezoelectric elements based on the parameter value of the first parameter, the parameter value of the second parameter, and the parameter value of the third parameter, each corresponding to the touch sense pattern values by changing the touch sense parameter values every predetermined time while the touch panel is touched, and when the touch action is ceased, the setting part sets the parameter value of the first parameter, the parameter value of the second parameter, and the parameter value of the third parameter, each corresponding to the touch sense pattern, when the touch action is ceased, as a setting value for vibrating the plurality of the piezoelectric elements.

2. The touch panel apparatus according to claim 1, wherein the plurality of touch sense pattern values stored in the touch sense pattern table indicate the length of time during which a user feels a touch sense and the strength of the touch sense.

3. The touch panel apparatus according to claim 1, wherein the first parameter is a voltage of a driving signal to be applied to the plurality of piezoelectric elements, the second parameter is a frequency of the driving signal to be applied to the plurality of piezoelectric elements, and the third parameter is a phase difference of the driving signal to be applied to the plurality of the piezoelectric elements.

4. The touch panel apparatus according to claim 1, wherein the plurality of the piezoelectric elements are arranged at both sides of the touch panel so as to be opposite to each other, the first parameter table, the second parameter table, and the third parameter table are provided for every pair of the opposed piezoelectric elements arranged at the both sides of the touch panel, and the vibration driving control part drives every pair of the piezoelectric elements based on the touch sense pattern values.

5. The touch panel apparatus according to claim 1, wherein the touch panel is provided with a plurality of setting reference areas, and the vibration control part drives the plurality of the piezoelectric elements based on the touch sense pattern values set every setting reference area.

6. A touch panel control method executed by a touch panel apparatus including a touch panel provided on a display surface of a display part and receives an operation, and a plurality of piezoelectric elements vibrating the touch panel, the touch panel control method comprising the steps of:
    driving the plurality of the piezoelectric elements based on a set parameter value of a first parameter, a set parameter value of a second parameter, and a set parameter value of a third parameter; and
    setting the parameter value of the first parameter, the parameter value of the second parameter, and the parameter value of the third parameter based on a plurality of touch sense pattern values which are made up of a combination of a plurality of parameter values of the first parameter stored in a first parameter table, a plurality of parameter values of the second parameter stored in a second parameter table, and a plurality of parameter values of the third parameter stored in a third parameter table, and are stored in a touch sense pattern table,
    wherein the plurality of the piezoelectric elements are vibrated based on the parameter value of the first parameter, the parameter value of the second parameter, and the parameter value of the third parameter, each corresponding to the touch sense pattern values by changing the touch sense parameter values every predetermined time while the touch panel is touched, and
    wherein when the touch action is ceased, the parameter value of the first parameter is set, the parameter value of the second parameter is set, and the parameter value of the third parameter is set, each corresponding to the touch sense pattern, when the touch action is ceased, as a setting value for vibrating the plurality of the piezoelectric elements.

\* \* \* \* \*